United States Patent
Dawson-Elli (10) Patent No.: US 6,243,527 B1
(45) Date of Patent: Jun. 5, 2001

(54) ATHERMALIZATION TECHNIQUES FOR FIBER GRATINGS AND TEMPERATURE SENSITIVE COMPONENTS

(75) Inventor: David F. Dawson-Elli, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/203,084

(22) Filed: Dec. 1, 1998

Related U.S. Application Data (60) Provisional application No. 60/071,620, filed on Jan. 16, 1998.

(51) Int. Cl.[7] ..................................................... G02B 6/00
(52) U.S. Cl. ............................................................. 385/136
(58) Field of Search ........................ 385/136, 37; 372/33, 372/34, 18, 29, 92, 102

(56) References Cited

U.S. PATENT DOCUMENTS

| | | | |
|---|---|---|---|
| 5,682,445 | * 10/1997 | Smith | 385/7 |
| 5,694,503 | * 12/1997 | Fleming et al. | 385/37 |
| 5,721,802 | * 2/1998 | Francis et al. | 385/137 |
| 5,757,540 | 5/1998 | Judkins et al. | 359/341 |
| 5,841,920 | 11/1998 | Lemaire et al. | 385/37 |
| 5,914,972 | * 6/1999 | Siala et al. | 372/33 |
| 6,044,189 | * 3/2000 | Miller | 385/37 |
| 6,101,301 | * 8/2000 | Engelberth et al. | 385/37 |
| 6,108,470 | * 8/2000 | Jin et al. | 385/37 |

* cited by examiner

Primary Examiner—Robert H. Kim
Assistant Examiner—Michael P. Stafira
(74) Attorney, Agent, or Firm—William J. Chervenak (57) ABSTRACT

An athermalization attachment for countering changes in optical characteristics of an optical fiber or other temperature sensitive optical device in response to changes in temperature. According to one aspect of the invention, a curved composite beam is attached to the fiber. The beam comprises two layers of dissimilar materials. The layer on the outside radius has a coefficient of expansion greater than that of the layer on the inside radius, such that increases in temperature cause the outside layer to expand more rapidly than the inside layer, thereby decreasing the radius of curvature of the beam. The coefficients of expansion of the layers are chosen such that the beam's temperature response counters optical changes which would otherwise occur in the fiber in response to temperature changes. In another approach, one point on a low-expansion block is attached to a point along an optical fiber. A high-expansion bar is attached to another point along the fiber, and positioned with respect to the fiber and the low-expansion block such that expansion of the high-expansion bar compensates for the temperature response of the fiber. A variety of additional geometries are disclosed.

13 Claims, 5 Drawing Sheets

ATHERMALIZATION TECHNIQUES FOR FIBER GRATINGS AND TEMPERATURE SENSITIVE COMPONENTS

This application is based upon the provisional applications Ser. No. 60/071,620, filed Jan. 16, 1998, which we claim as the priority date of this application.

FIELD OF THE INVENTION

The present invention relates generally to improvements in optical fiber gratings and other temperature sensitive components. More particularly, the present invention relates to methods and apparatus for athermalization of fiber gratings and other temperature sensitive components utilizing robust materials having a positive coefficient of thermal expansion.

BACKGROUND OF THE INVENTION

Fiber gratings are under intense investigation as reflecting or dissipating elements in photonic components. It is desirable to have the grating not respond to changes in ambient temperature. A simply supported fiber with a grating written in it will shift in center wavelength as it is heated, as thermal expansion changes the period of the grating. Moreover, changes in temperature also cause shifts in the refractive index of the grating material.

In the prior art, short period gratings have been athermalized using beta-eucryptite, which has a negative coefficient of thermal expansion. In other words, beta-eucryptite shrinks as the temperature increases and expands as the temperature decreases. A fiber with a grating written on it is placed in tension and attached to the beta-eucryptite substrate, with the fiber being attached to the substrate at two points along its length. The fiber has a positive coefficient of thermal expansion. As the ambient temperature increases or decreases, the beta-eucryptite substrate shrinks or expands tending to compensate for the fiber's tendency to physically expand or shrink and its change in refractive index with change in temperature. The substrate is preferably chosen and designed such that the shrinking as temperature increases or the expansion as temperature decreases of the substrate exactly cancels the intrinsic response of the fiber to temperature changes.

The beta-eucryptite substrates of the present state of the art, however, presently require a hermetic package to survive the damp heating which may occur in a variety of typical real world environments. The beta-eucryptite material is microcracked, and the presence of moisture causes a hysteresis in the expansion and contraction response of the substrate. The necessity of enclosure in a hermetic package increases expense. The hermetic package also requires additional space and decreases the suitability of beta-eucryptite substrates in space critical applications.

There exists, therefore, a need in the art for a technique of fiber grating athermalization using robust materials with positive coefficients of temperature expansion. A similar need exists for other temperature sensitive components, such as an external cavity mode-locked laser which requires an athermalization package.

SUMMARY OF THE INVENTION

The present invention advantageously addresses such needs as described in greater detail below. According to one aspect of the invention, a curved composite strip is attached to two points along a tensional length of fiber grating. As the temperature increases or decreases, the radius of curvature of the strip decreases or increases compensating for the thermal response of the length of fiber grating between the attachment points. According to another aspect of the invention, a substrate of zero expansion and a bar of similar expansion to a length of tensional fiber are arranged and attached to the fiber so as to cancel the thermal response of the fiber. The bars can be chosen and arranged in a variety of different geometries, and the illustration of various specific geometries below does not limit the invention to the specific configurations shown.

A more complete understanding of the present invention, as well as further features and advantages of the invention, will be apparent from the following Detailed Description and the accompanying drawings.

DETAILED DESCRIPTION

Figure 1:
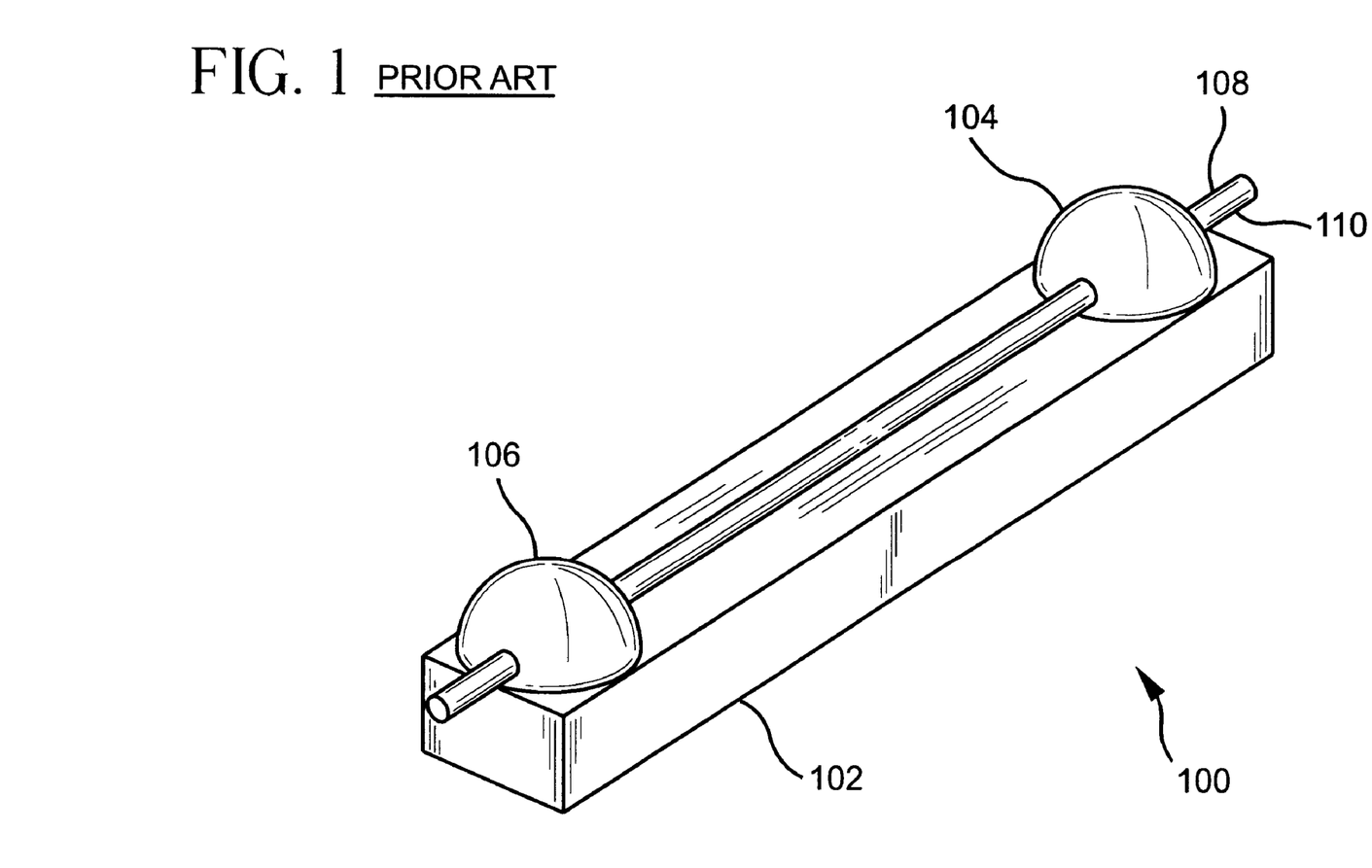
FIG. 1 illustrates aspects of the beta-eucryptite athermalization structure of the prior art.

FIG. 1 illustrates a fiber and substrate assembly 100 in accordance with the prior art shown without a hermetic seal for ease of illustration. Assembly 100 includes a beta-eucryptite substrate 102, to which are affixed first frit attachment 104 and second frit attachment 106. A fiber 108 is tensioned and attached to the assembly 100 as follows. The fiber 108 runs longitudinally between the first and second frit attachments 104 and 106 and is attached to each of the first and second frit attachments 104 and 106 at a point along its length. The fiber 108 has written into it a grating 110.

As the ambient temperature changes, a fiber of the material of which fiber 108 is made and which is sitting free in space will undergo changes in its optical characteristics, such as changes in its center wavelength. These changes are due to changes in the period of the grating 110 due to physical expansion, a dd/dt component, and to changes in the refractive index of the fiber, a dn/dt component, due to changes in temperature.

As the temperature of the assembly 100 changes, the substrate 102 will undergo expansion or contraction as a result of the temperature changes. Substrate 102 is so chosen, and assembly 100 is so designed, that its expansion and contraction in reaction to temperature changes will compensate for the temperature changes or response of fiber 108. Thus, within a predetermined range of temperatures of operation, the assembly 100 will be athermalized.

Due to microcracks inherent in the beta eucryptite material, the presence of moisture will cause the substrate 102 to suffer hysteresis in its expansion and contraction response. In order to prevent this hysteresis, it is necessary to surround the assembly 100 with a hermetic seal which is not shown to isolate the assembly from moisture. The need for a hermetic seal increases the complexity of the manufacturing process and the overall size and cost of the assembly.

Figure 2:
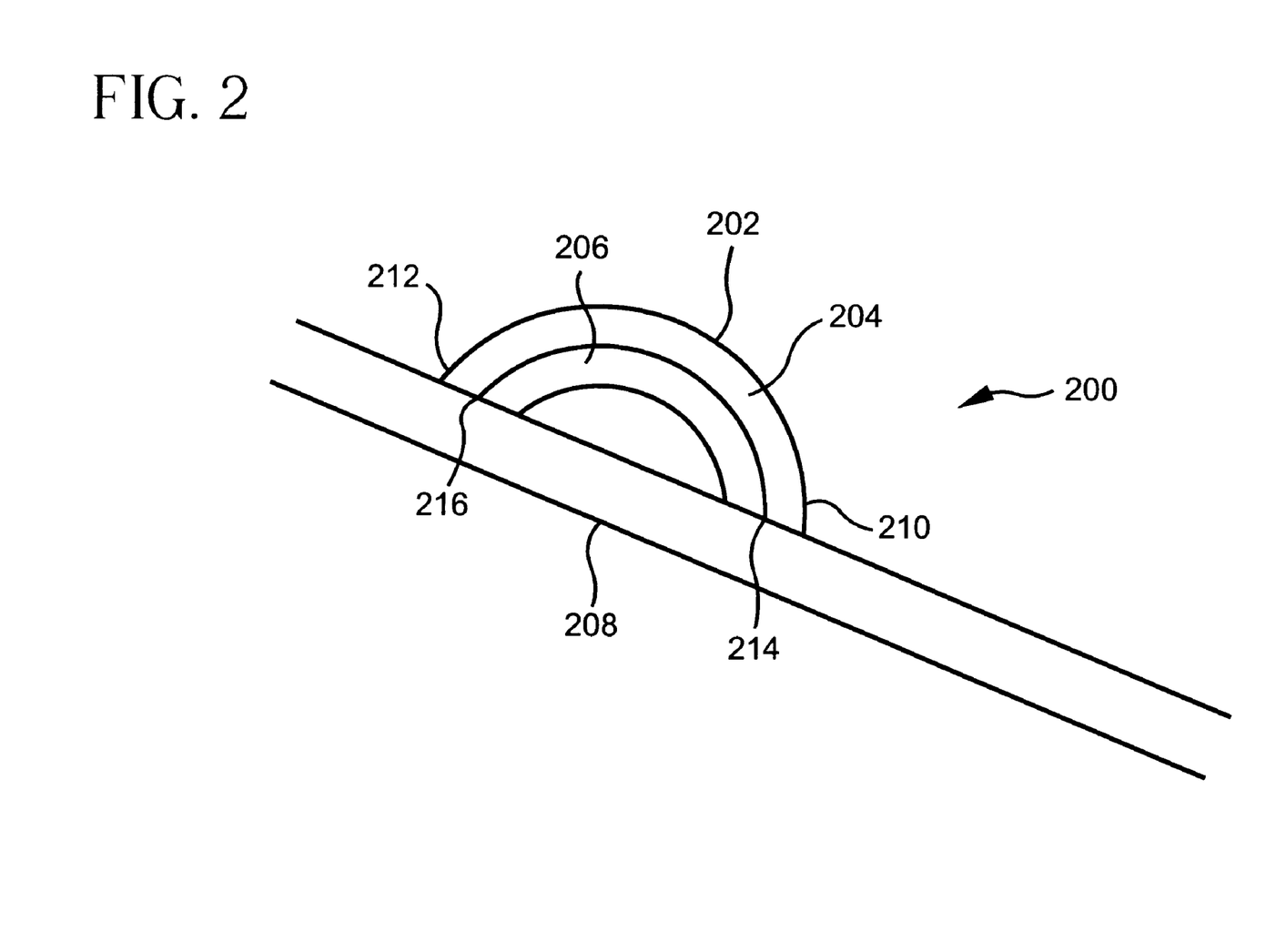
FIG. 2 illustrates a composite-beam athermalization attachment according to one aspect of the present invention.

FIG. 2. illustrates a composite beam fiber assembly 200 in accordance with the present invention which eliminates the need for a hermetic seal. Assembly 200 includes a bent composite beam 202. At a particular temperature, the composite beam 202 has a predetermined radius of curvature. Composite beam 202 includes a first region 204 and a second region 206. A fiber 208 is tensioned and attached to the composite beam 202 at first and second ends 210 and 212 of composite beam 202. The first and second ends 210 and 212 are attached to fiber 208 at points 214 and 216 which are spaced apart along the length of fiber 208. First region 204 comprises a material having a higher coefficient of thermal expansion than does the material of second region 206. Region 204 may suitably be formed from soda lime glass, and region 206 may suitably be code 1737 or code 7059 glass. Therefore, as the ambient temperature increases, first region 204 expands more quickly than does second region 206, causing the radius of curvature of the composite beam 202 to decrease. As the radius of curvature of composite beam 202 decreases, the distance between the attachment points 214 and 216 decreases. The fiber grating 208 is athermalized and can operate over a wide range of temperatures without any changes in its optical response. Conversely, as the ambient temperature falls, the radius of curvature of composite beam 202 is increased. This increase acts to counterbalance optical changes which would otherwise occur in the portion of fiber 208 between points 214 and 216 due to its temperature response. Thus, a grating on the portion of fiber 208 between points 214 and 216 can be suitably athermalized without the need for a hermetic seal or enclosure.

Figure 3:
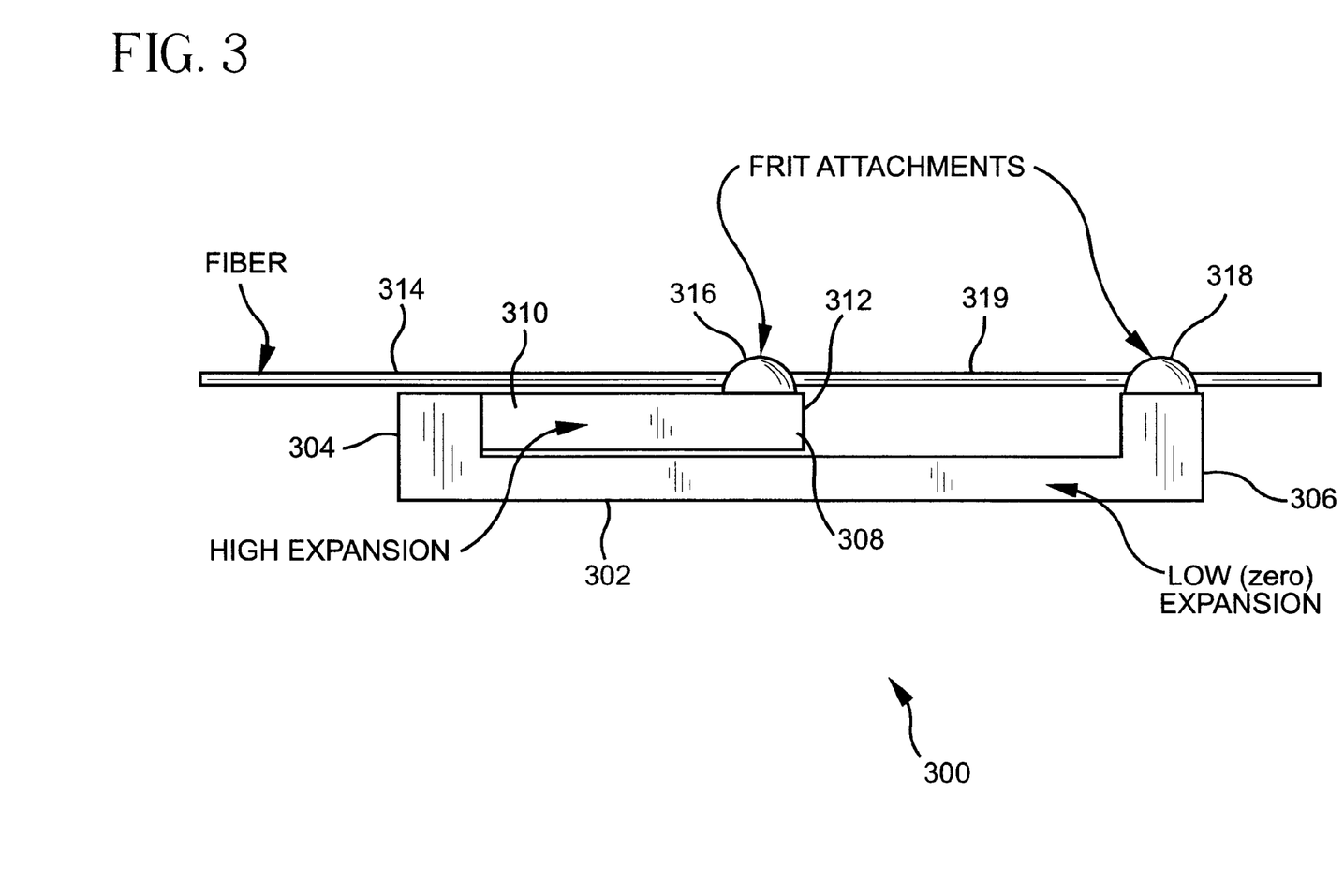
FIG. 3 illustrates an athermalization structure including a low-expansion block and a high-expansion bar according to another aspect of the present invention.

FIG. 3 illustrates an alternative fiber assembly 300 according to another aspect of the present invention. Assembly 300 includes a low expansion block 302 having a first side 304 and a second side 306. The low expansion block 302 may be suitably formed from silica, titania-silica, or other material having a suitably low positive coefficient of thermal expansion. Titania-silica is presently preferred as its coefficient of thermal expansion is near zero.

Attached to the low expansion block 302 is a high expansion bar 308. The high expansion bar may suitably be formed from soda lime glass. The high expansion bar 308 has a first end 310 and a second end 312. The first end of the high expansion bar 308 is attached to the first side of the low expansion block 302, and the high expansion bar extends toward the second side 306 of the low expansion block 302. A fiber 314 is tensioned and attached to the high expansion bar 308 and the low expansion block 302 by means of first and second frit attachments 316 and 318, respectively. While frit attachments are presently preferred, it is contemplated that the connection points could be metallized and soldered. Other connections might also be suitably employed so long as they were adequately strong to transmit the required forces without weakening or breaking.

The fiber 314 is attached to the second end 312 of the high expansion bar 308 by means of the first frit attachment 316. The fiber 314 is attached to the second side 306 of the low expansion block 302 by means of the second frit attachment 318. The high expansion bar 308 is preferably chosen to have a coefficient of expansion and a length to exactly compensate for the thermal response of the portion of the fiber 314 between the frits 316 and 318. The high expansion bar 308 will then expand and contract in response to temperature changes so as to athermalize this portion the fiber 314 by bringing attachment points 316 and 318 closer together upon heating and farther apart upon cooling. In other words, the expansion and contraction of the high expansion bar 304 in response to temperature changes compensates for the thermal response of the portion of the fiber 314 between the frits 316 and 318 to temperature changes. Thus, a grating 319 formed in this portion of the fiber 314 is suitably athermalized. A suitable grating may be formed by periodically exposing a length of fiber to very high intensity laser light. In the regions exposed to the laser, the index of refraction of the glass of the fiber is changed creating a fiber having a grating "written" on it.

A series of calculations help illustrate the operation of this FIG. 3 embodiment. If we define, $\Delta I_1 \equiv \alpha_1 x_1 \Delta T$, where $\alpha_1$=the expansion of part 302, and $x_1$=the length of the portion of part 302 from point 318 to where part 310 attaches at point 316, and $\Delta I_2 \equiv \alpha_2 x_2 \Delta T$ where $\alpha_2$=the expansion of part 308, and $x_2$=the length of part 308 from point 310 to point 316, then $\Delta I_3 = \Delta I_1 - \Delta I_2$=the change in distance between points 318 and 316.

Therefore, $\Delta I_3 = x_1 \alpha_1 \Delta T - x_2 \alpha_2 \Delta T = (x_1 \alpha_1 - x_2 \alpha_2) \Delta T$.

If $x_1 \alpha_1 > x_2 \alpha_2$, then $\Delta I_3 > 0$ for $\Delta T > 0$, or in other words a "net positive expansion" occurs for positive temperature changes where these part dimensions are employed.

If, on the other hand, $x_1 \alpha_1 < x_2 \alpha_2$, then $\Delta I_3 < 0$ and for $\Delta T > 0$ a "net negative expansion" is achieved.

Finally, if $x_1 \alpha_1 = x_2 \alpha_2$, then $\Delta I_3 = 0$.

Therefore, by selecting $x_1$, $\alpha_1$, $x_2$, and $\alpha_2$ properly the value of $\Delta I_3$ can be varied to meet the application requirements. Thus, the present invention provides great design flexibility to satisfy a variety of applications requiring athermalization.

Figure 4:
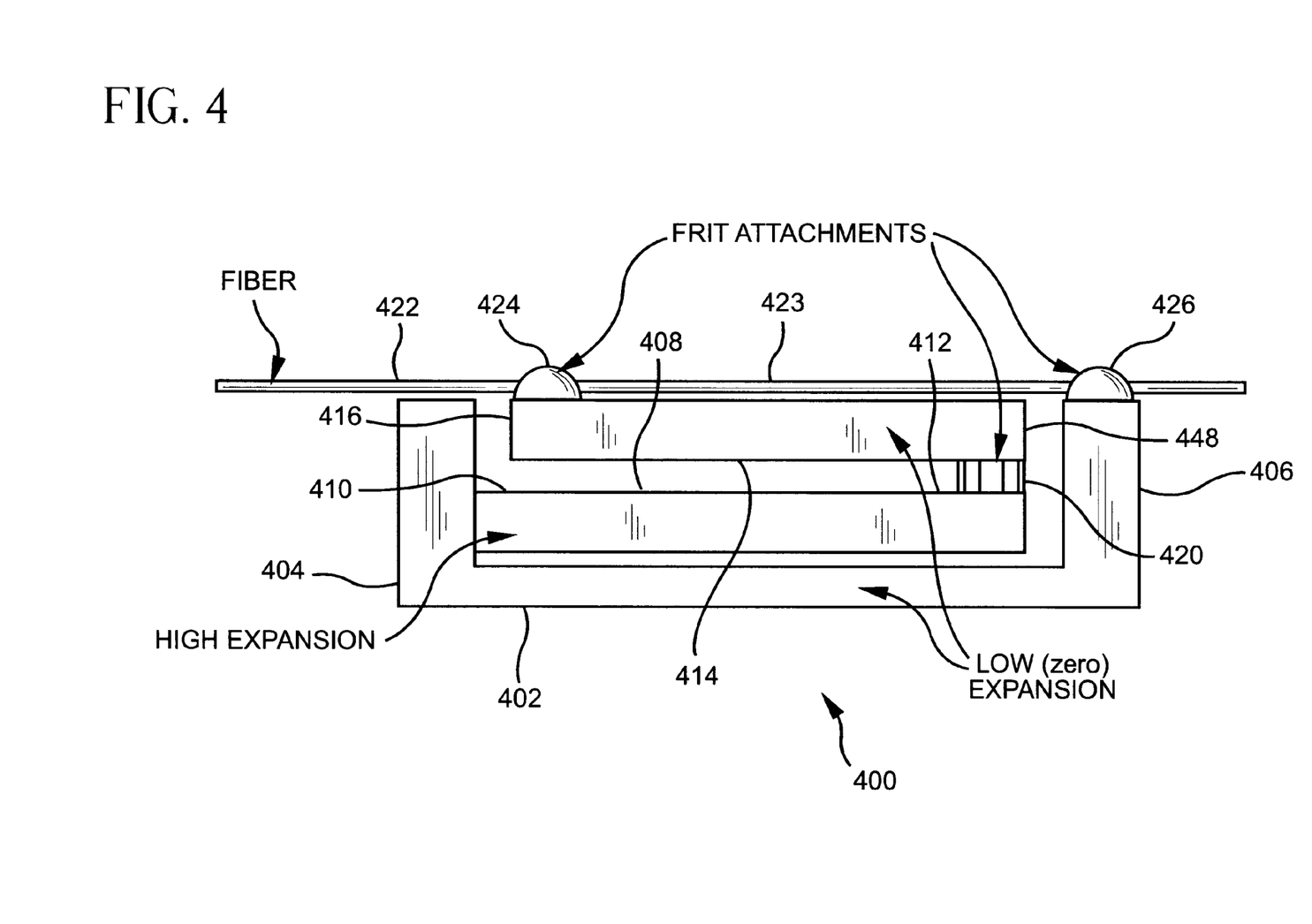
FIG. 4 illustrates an athermalization structure including a low-expansion block, a high-expansion bar, and a low-expansion bar according to a further aspect of the present invention.

FIG. 4 illustrates a fiber assembly 400 according to another aspect of the present invention, showing an alternative geometry to the one illustrated in FIG. 3. Assembly 400 includes a first low expansion block 402 having a first side 404 and a second side 406. Assembly 400 also includes a high expansion bar 408. The high expansion bar 408 has a first end 410 and a second end 412. The high expansion bar 408 is attached to the first low expansion block 402, with the first end 410 of the high expansion bar 408 being attached to the first side of the first low expansion block 402, and the second end 412 of the high expansion bar 408 extending toward the second side 406 of the low expansion block 402.

Attached to the high expansion bar 408 is a second low expansion bar 414 having a first end 416 and a second end 418. The second low expansion bar 414 is preferably attached to the high expansion bar 408 by way of a first frit attachment 420. The second end 418 of the second low expansion bar 414 is attached by way of the first frit attachment 420 to the second end 412 of the high expansion bar 408. The first end of the second low expansion bar 414 extends toward the first side 404 of the low expansion block 402.

Attached to and running between the low expansion bar 414 and the low expansion block 402 is a fiber 422 having a grating 423 written on it. The fiber 422 is attached to the first end 416 of the first low expansion block 402 by way of a second frit attachment 424, while the fiber 422 is attached to the second side 406 of the first low expansion block 402 by means of a third frit attachment 426.

As a result of increases in ambient temperature, the high expansion bar 408 tends to expand, and as a result of decreases in ambient temperature, it tends to contract. By properly selecting the length and coefficient of thermal expansion of the bar 408, its expansion and contraction will compensate for the thermal response of the portion of the fiber 422 between the frits 424 and 426. The coefficient of expansion of high expansion bar 408 multiplied times its length is preferably chosen so as to compensate optical changes in said portion of fiber 424 proportional to its coefficient of expansion multiplied times the length of said portion plus the change in index of refraction, n, for the change in temperature. These arrangements of the present invention can be readily tuned or adjusted to match fibers of various materials having gratings of a wide range of periods.

Figure 5:
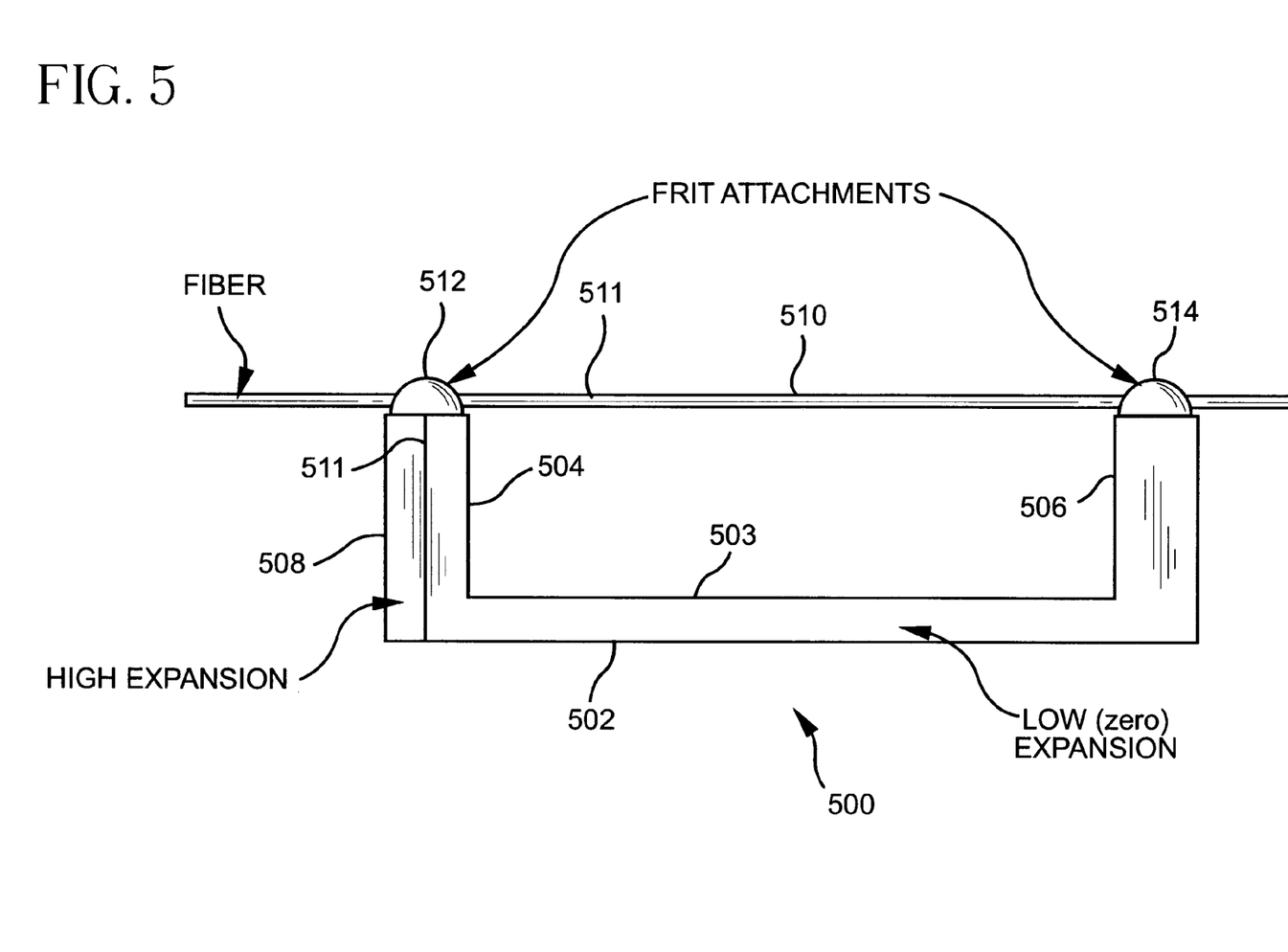
FIG. 5 illustrates an alterative-geometry athermalization structure including a low-expansion block and a high-expansion bar according to another aspect of the present invention.

FIG. 5 illustrates a fiber assembly 500 according to another aspect of the present invention, showing another alternative geometry to those illustrated in FIGS. 4 and 5. Assembly 500 includes a generally U-shaped low expansion block 502 having a base 503, a first side 504 and a second side 506. First and second sides 504 and 506 are preferably generally parallel to one another and generally perpendicular to base 503.

Assembly 500 also includes a high expansion bar 508 attached to low expansion block 502 at, and generally parallel to, first side 504 of low expansion block 502. A fiber 510 is attached to and runs between a junction 511 of low expansion bar 502 and high expansion block 508, and the second side 506 of low expansion block 502. The fiber 510 may suitably include a grating 511. Fiber 510 is preferably attached to the junction 511 by means of first frit attachment 512 and to the second side 506 of low expansion block 502 by means of second frit attachment 514.

High expansion bar 508 expands and contracts in response to increases and decreases in ambient temperature. The expansion and contraction of high expansion bar 508 tends to bend the left side 504 of low expansion block toward and away from the right side 506 of low expansion block 502, respectively, thus moving first frit attachment 512 toward and away from second frit attachment 514. The coefficient of thermal expansion and other properties of high expansion bar 508 are preferably chosen such that the movement of first frit attachment 512 caused by expansion bar 508 compensates for the thermal response of the portion of fiber 510 between the frits 512 and 514.

While the present invention is disclosed in the context of presently preferred embodiments, it will be recognized that a wide variety of implementations may be employed by persons of ordinary skill in the art consistent with the above discussion and the claims which follow below. By way of example, different geometries may be employed, different materials may suitably be employed and the athermalization techniques may be employed in contexts other than fiber gratings.

I claim:

1. An athermalization attachment for an optical fiber, the attachment having a positive coefficient of thermal expansion and undergoing expansion and contraction to the fiber at at least two points along a tensioned length of the fiber, the expansion and contraction of the attachment compensating for the thermal response to changes in temperature of the portion of the fiber between said at least two points, said attachment comprising:

a curved strip having a radius of curvature, the strip being attached to the fiber at each of two end points of the radius of curvature, the strip comprising an inward portion of a first material having a first coefficient of expansion and an outward portion of a second material, the second material having a second coefficient of expansion greater than the first coefficient expansion of the first material, the first and second materials expanding and contracting in response to changes in temperature, the expansion and contracting of the first and second materials decreasing and increasing in the radius of curvature of the strip in response to increases and decreases in temperature.

2. The attachment of claim 1 wherein the inward portion is a material having a low coefficient of expansion.

3. The attachment of claim 1 wherein the outward portion is a material having a high coefficient of expansion.

4. An athermalization structure for attachment to an optical fiber, the optical fiber undergoing changes in optical characteristics in response to changes in temperature in the absence of the athermalization structure, comprising:

a low-expansion block, attached to the fiber at a first point on the low-expansion block, the first point on the low-expansion block being attached to the fiber at a first point along the length of the fiber; and a high-expansion bar attached between the fiber and the low-expansion block, the high-expansion bar being attached between a second point on the low expansion block and a second point along the length of the fiber, the high-expansion bar being attached and having length and a coefficient of thermal expansion such that expansion and contraction of the high expansion bar act to compensate for changes in optical characteristics of the portion of the fiber between the first and second points along the length of the fiber in response to changes in temperature.

5. The athermalization structure of claim 4 herein the high-expansion bar is attached to the second point on the low-expansion block at a first point on the high-expansion bar, and wherein the high-expansion bar is attached to the second point on the fiber at a second point on the high-expansion bar.

6. The athermalization structure of claim 4 wherein a first point on the high-expansion bar is attached to the low-expansion block at a second point on the low-expansion block, and wherein a low-expansion bar is attached to the high-expansion bar at a second point on the high-expansion bar, the low-expansion bar being attached to the high-expansion bar at a first point on the low-expansion bar, the low expansion bar having a second point attached to the fiber at the second point along the fiber.

7. The athermalization structure of claim 4 wherein the optical fiber has a grating which is athermalized by the athermalization structure.

8. The athermalization structure of claim 4 wherein the optical fiber is tensioned before its attachment to the athermalization structure.

9. An athermalization structure for attachment to an optical fiber, the optical fiber undergoing changes in optical characteristics in response to changes in temperature in the absence of the athermalization structure, comprising:

a low-expansion block having a first side and a second side, the first side and the second side being offset from one another, the first side being attached to the fiber at a first point along the fiber and the second side being attached to the fiber at a second point along the fiber; and a high-expansion bar being attached to the low-expansion block at the second side of the low-expansion block, the high expansion bar undergoing expansion and contraction in response to the changes in temperature, the expansion and contraction of the high-expansion bar in response to changes in temperature acting to prevent said changes in optical characteristics of the portion of the fiber between the first and second points along the fiber in response to the changes in temperature.

10. The athermalization structure of claim 9 wherein the low-expansion block includes a third side between the first side and the second side, wherein the first side and the second side of the low-expansion block are parallel to one another such that the low-expansion block forms a generally "U" shape, and wherein the high-expansion bar is attached to the second side at the outside of the "U" and generally parallel to the second side.

11. The athermalization structure of claim 4, 5, 6, 7 or 10 wherein the attachments of the fiber to the high-expansion bar and the low-expansion block are made with frit attachments.

12. The athermalization structure of claim 4, 5, 6, 7 or 10 wherein the attachments of the fiber to the high-expansion bar and the low-expansion block are made through metallization and soldering.

13. The athermalization structure of claim 10 wherein the portion of the optical fiber between the first and second points along the fiber is tensioned.

* * * * *

UNITED STATES PATENT AND TRADEMARK OFFICE
CERTIFICATE OF CORRECTION

PATENT NO. : 6,243,527 B1
DATED : June 5, 2001
INVENTOR(S) : David F. Dawson-Elli It is certified that error appears in the above-identified patent and that said Letters Patent is hereby corrected as shown below:

Column 5,
Line 62, after the word "contraction", please insert the word -- relative -- and after the word `"fiber" please insert -- and attached to the fiber --.

Column 6,
Line 10, please change the word "contracting" to -- contraction --.
Line 37, please change the word "herein" to -- wherein --.

Signed and Sealed this

Twentieth Day of August, 2002

*Attest:*

*Attesting Officer*

JAMES E. ROGAN
*Director of the United States Patent and Trademark Office*